Aug. 24, 1954  B. H. VAN VACTOR  2,687,008
SAFETY EXHAUST SYSTEM FOR INTERNAL-COMBUSTION ENGINES
Filed March 19, 1953  2 Sheets-Sheet 2
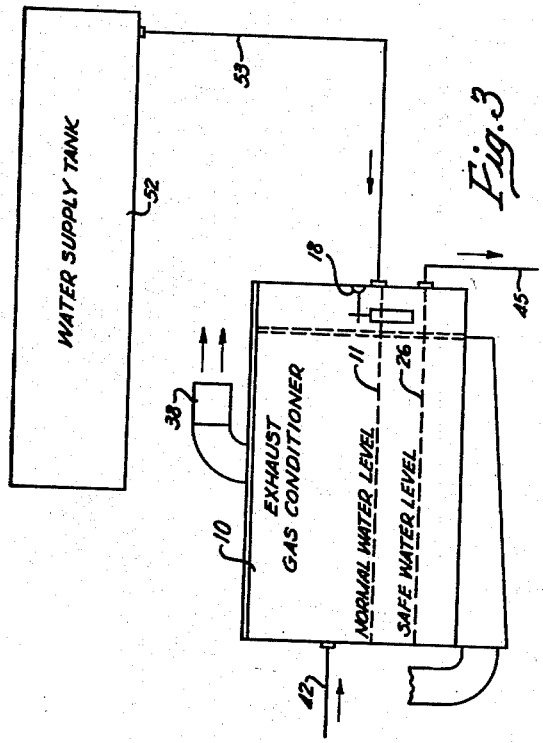
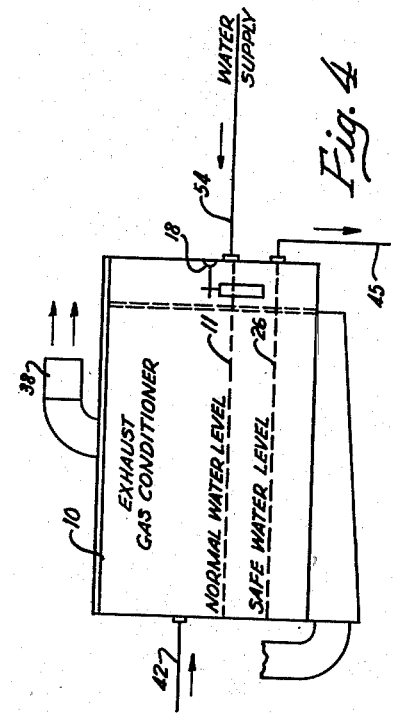
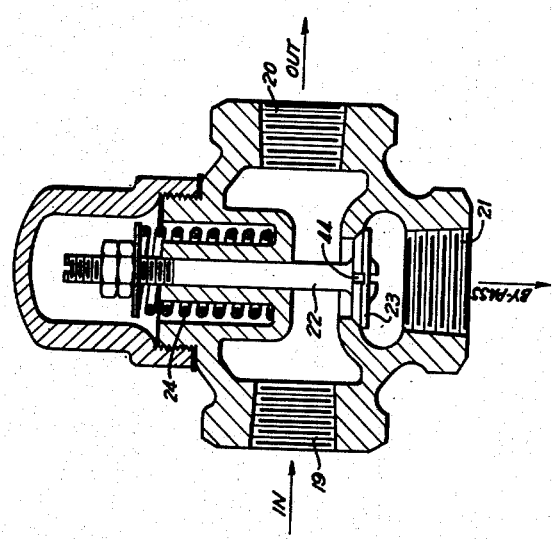
INVENTOR.
BENJAMIN H. VAN VACTOR
BY
HIS ATTORNEYS Patented Aug. 24, 1954

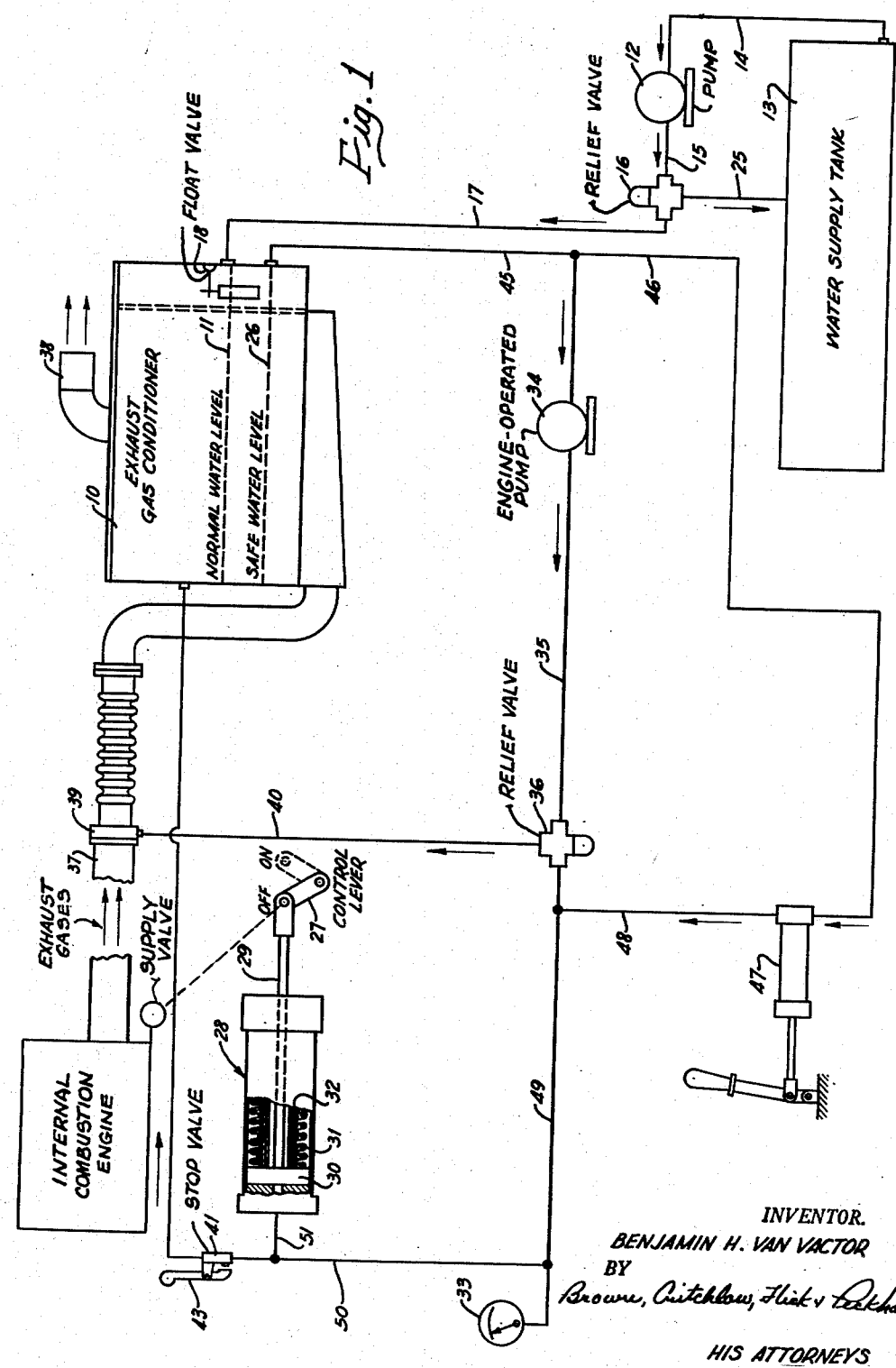

2,687,008

UNITED STATES PATENT OFFICE 2,687,008

SAFETY EXHAUST SYSTEM FOR INTERNAL-COMBUSTION ENGINES

Benjamin H. Van Vactor, Beckley, W. Va., assignor to National Mine Service Company, a corporation of West Virginia Application March 19, 1953, Serial No. 343,378

12 Claims. (Cl. 60—30)

The present invention relates to a safety system for use in connection with the exhaust of diesel or other internal combustion engines.

The invention is particularly useful for diesel engines when used in mines and similar confined locations where the exhaust must be treated in a special exhaust conditioner before it can be safely discharged into the confined space. The system of the present invention is so arranged that the engine cannot be operated unless the exhaust gas conditioner is in satisfactory operating condition.

A particular feature of the invention is an arrangement of means whereby the engine cannot be started unless the exhaust gas conditioner is in proper operating condition.

Another object of the invention is to provide a system in which the operation of the engine is automatically stopped at any time the exhaust gas conditioner is not in proper operating condition.

These and other objects and advantages of the invention will become clear as the description proceeds.

In the drawings:

Fig. 1 is a diagram illustrating the safety exhaust system.

Fig. 2 is a cross section through the relief valve used in the system.

Fig. 3 is a diagram illustrating an alternate arrangement for water supply.

Fig. 4 is a diagram illustrating another form of water supply.

Referring to the drawings in greater detail, the numeral 10 indicates an exhaust gas conditioner. Since the details of this conditioner form no part of the present invention, they will not be explained fully in the present application. This exhaust gas conditioner receives the exhaust gas from the diesel engine, cools it to 160° F. or less, removes noxious odors and deleterious substances that may be contained in the gas, and eliminates the possibility of sparks issuing from the exhaust conditioner. The exhaust gas conditioner performs these functions while maintaining all exterior surfaces at a temperature of below 400° F.

In order to perform the above functions in the exhaust gas conditioner, it is essential to maintain a certain water level in the sump of the gas conditioner. A device of this general type in which a level of water must be maintained for proper operation is illustrated in expired U. S. Patent No. 733,217. In the form of Fig. 1 of the present application this level is mantained by providing a pump 12 suitably driven from the engine, which pumps water from the water supply tank 13 through relief valve 16, to the exhaust gas conditioner. A float valve 18 regulates the admission of water to the exhaust gas conditioner and maintains a "normal" water level at the line indicated by numeral 11. A "safe" water level is indicated at 26, and whenever the water drops below this level the safety system prevents operation of the engine.

The relief valve 16 is of the type illustrated in detail in Fig. 2. As illustrated, this valve includes an inlet port 19, an outlet port 20, and a by-pass port 21. The by-pass port is normally closed by a poppet-type valve 22, which has a head 23, and is held in closed position against its seal by a spring 24.

When this type of valve is used at 16, the spring is set so that the valve opens when a pressure of 12 lbs. per square inch or greater is applied to the under-side of the head 23. The result is that when the water level falls below the "normal" level indicated at line 11, the float valve 18 is open, and water passes directly through valve 16, from inlet 19 to outlet 20, and thence to the exhaust gas conditioner. However, when the water reaches level 11 and float valve 18 closes, pressure builds up in the line 17 leading to valve 18, and when this pressure exceeds 12 lbs. per square inch, the relief valve 16 opens and the water goes through by-pass port 21 directly back to the water supply tank 13, through line 25.

The parts including the pump 12, relief valve 16 and float valve 18 constitute automatic means to maintain a safe level of water in the exhaust gas conditioner. While it is presently preferred to use water in the exhaust gas conditioner, it should be understood that any other suitable liquid may be used.

Equivalent means may be utilized to provide the automatic means for maintaining the water level in the exhaust gas conditioner. In some installations it may be preferable to use a supply tank 52 located above the exhaust gas conditioner, as shown in Fig. 3. In this case the water is fed to the gas conditioner through gravity line 53. Or, as shown in Fig. 4, a pressure line 54 connected to a conventional water system may deliver water direct to the valve 18.

As previously explained, the exhaust gas conditioner 10 is so built that it cannot operate correctly to cool and condition the exhaust gases so as to make them safe for exhausting them into a mine or other confined area, unless the water level is at or above the "safe" level 26. The part of the system now to be described provides means which present starting the engine unless the water level is at the minimum "safe" water level. The system also includes means that will automatically stop operation of the engine when the water level drops below the "safe" water level.

The control lever 27 may be connected to either the air or fuel supply to the engine, whichever is the most effective method of preventing operation of the particular engine. Since both air and fuel are essential to engine operation, either of these fluids may be referred to as "an essential fluid." In the case of a two-cycle diesel engine, this lever would preferably control the air supply, since this type of engine is usually shut down in this manner, and so long as the air-intake valve is closed the engine will not start, nor will it receive enough air to fire on any of its cylinders. In the case of a four-cycle diesel engine it is preferable to use the control lever 27 to shut off the fuel supply.

The control lever 27 is operated by a pressure-controlled actuator indicated generally at 28, which includes an actuator rod 29 connected at one end to lever 27 and at the other end to a piston 30. Springs 31 and 32 normally bias the piston 30 toward the left as shown in Fig. 1, and the piston 30 is moved toward the right by pressure from line 51. It will be clear that the springs normally bias the control lever to "off" position, in which the engine is stopped and cannot be started.

The pressure-controlled actuator may be moved by some device such as a pressure bellows in place of the piston 30.

In order to move the lever to the "on" position and permit starting the engine, it is necessary to supply liquid pressure to the piston 30. This is done as follows: A liquid line 45 is connected to the sump of the exhaust gas conditioner at the safe water level 26. If water is at this level or higher, it may be drawn into liquid lines 45 and 46 by hand pump 47, and thence forced through liquid lines 48, 49, 50 and 51, to the control-lever actuator 28.

When the operator wishes to start the engine, he operates the hand pump 47. If the water in the exhaust gas conditioner is below the safe water level 26 no water is sucked into the liquid line 45, and hence no pressure is supplied to the control-lever actuator 28, and the engine cannot be started. But if water is at or above the safe level 26, water is pumped through lines 45 and 46 to the hand pump 47, and thence through lines 48, 49, 50, and 51, to the piston 30, and the pressure, after it reaches a pressure between 8 and 10 lbs. as indicated by the pressure gage 33, moves the control-lever 27 against the pressure of springs 31 and 32 to the "on" position. The operator maintains this pressure with the hand-operated pump 47 until the engine is started.

The hand pump 47, piston 30, and connecting hydraulic lines constitute manually controlled means for moving the control-lever to "on" position.

When the engine starts running, it operates safety pressure pump 34, which is driven by the engine. Pump 34 pumps water from the line 45 through the line 35 and relief valve 36 to line 49, thereby taking over from hand pump 47 the chore of maintaining behind the piston 30 pressure that holds the control-lever in the "on" position. If, at any time, the water in the exhaust gas conditioner drops below the "safe" water level 26, water is no longer supplied under pressure by pump 34 to the piston 30, and the control-lever is immediately moved to the "off" position by the springs. This arrangement insures that the engine will stop operating whenever the water level in the exhaust gas conditioner drops below the "safe" operating level.

The engine-operated pump 34, piston 30, and connecting hydraulic lines constitute engine-controlled means for moving the control-lever to "on" position.

It will be understood that hand-operated pump 47, which is illustrated as being a plunger pump, must be so constructed that when it is not being operated it serves as a check valve to prevent backward flow from line 48 to line 46, thus permitting the engine-operated pump 34 to build up pressure in line 49.

The engine-operated pump 34, which is illustrated as being a rotary pump, must be so constructed that when it is not operating it blocks backward flow from line 35 to line 45, or it must be supplemented by a check valve to achieve this purpose. This construction permits the hand-operated pump 47 to build up pressure in line 49.

The exhaust gases from the engine are discharged through the water-cooled exhaust manifold 37 to the lower part of the exhaust gas conditioner, and after being properly conditioned, are permitted to escape through the exhaust outlet 38. A cooling ring 39 provides radial water jets which spray and cool the exhaust gases passing through ring 39, and supply line 40 carries water from the relief valve 36 to the cooling ring 39. The injection of this water through the cooling ring 39 helps to maintain the exterior surfaces of the exhaust system at all times well below the maximum allowable temperature of 400° F.

The pressure relief valve 36 is of the type illustrated in Fig. 2, and the actuating spring 24 is set so as to permit the valve to open the by-pass port when the pressure in line 35 reaches 12 lbs. per square inch. At top speed of the engine, due to the increased output of the pump and the resultant increased frictional resistance through the jets of the cooling ring 39, the pressure may rise to 30 or 35 lbs. per square inch in the line 40. In other words, the valve 36 serves to make certain that a minimum of 12 lbs. per square inch of water pressure is maintained against the pressure bellows 32 as long as the "safe" water level exists in the gas conditioner.

To provide for stopping the engine manually, a manual stop valve 41 is connected on one side to the liquid line 50, and on the other side is connected by a liquid line 42 to the upper part of the exhaust gas conditioner. The operating lever 43 of the valve 41 is connected in any suitable manner to a fuel shut-off handle located on the instrument panel of the engine. When the fuel shut-off handle is pulled, the quick-opening stop valve 41 releases the liquid pressure behind piston 30, and permits this pressure to be relieved directly into the upper part of the exhaust gas conditioner. The release of pressure permits the springs 31 and 32 to move the control-lever 27 to the "off" position, thereby stopping the engine.

The relief valve 36 is provided with means to prevent the possibility of water pressure being trapped in the control-lever actuator 28. This is done by providing a slot 44 milled into the under side of head 23 so that water may slowly leak past the valve head into the by-pass port.

In the event the water in the exhaust gas conditioner is below the safe level 26, pumps 34 and 47 could pump air. The slot 44 is of such a size that it will bleed off through line 40 to the cooling jets in ring 39 the combined air output of these pumps, so that air pressure cannot be built up to cause the actuator 28 to move the control-lever to the "on" position.

It will be clear from the above that present invention provides a foolproof safety system for a diesel or other internal combustion engine operated in confined quarters, such as in a mine, since the system permits the engine to operate only if the exhaust gas conditioner is in proper operating condition.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. In an exhaust system for internal combustion engines, of the type having an exhaust gas conditioner in which a certain safe level of liquid must be maintained for proper operation of the exhaust gas conditioner, the improvement which comprises: a control device which controls the supply of an essential fluid to the engine; means constantly biasing the control device toward "off" position; manually-controlled means for moving the control device to "on" position; and engine-controlled means for holding the control device in "on" position, the manually-controlled means and the engine-controlled means being effective only if the liquid in the exhaust gas conditioner is at or above the safe level.

2. An exhaust system of the type specified in claim 1 in which the manually-controlled means includes a hand-operated pump and the engine-controlled means includes an engine-operated pump.

3. An exhaust system of the type specified in claim 1 which includes automatic means to maintain a safe level of fluid in the exhaust gas conditioner.

4. In combination with an internal combustion engine, an exhaust system of the type having an exhaust gas conditioner in which a safe level of liquid must be maintained for proper operation of the exhaust gas conditioner, the improvement which comprises: a control-lever which controls the supply of an essential fluid to the engine; means constantly biasing the control lever toward "off" position; pressure-operated means for moving the control-lever toward "on" position; manually-controlled means for supplying pressure to the pressure-operated means to permit starting of the engine; and engine-controlled means for supplying pressure to the pressure-operated means to permit the engine to continue operating; the manually-controlled means and the engine-controlled means being effective only if the liquid in the exhaust gas conditioner is at or above the same level.

5. An exhaust system of the type specified in claim 4 in which the manually-controlled means includes a hand-operated pump and the engine-controlled means includes an engine-operated pump.

6. An exhaust system of the type specified in claim 4 in which a manual stop valve is connected to the pressure-operated means, whereby operation of the stop valve stops the motor.

7. An exhaust system of the type specified in claim 4 which includes automatic means to maintain a safe level of liquid in the exhaust gas conditioner.

8. In combination with in internal combustion engine an exhaust system including an exhaust gas conditioner having a sump in which a certain safe level of liquid must be maintained for proper operation of the exhaust gas conditioner, the improvement which comprises: a control-lever which controls the supply of an essential fluid to the engine; a spring constantly biasing the control lever toward "off" position; a pressure-operated device for moving the control lever toward "on" position; a liquid line leading from the sump at the safe liquid level and connected to the pressure-operated device; an engine-operated pump located in the liquid line for supplying liquid pressure to the pressure-operated device during the time when the engine is running; and a hand-operated pump connected to the liquid line and by-passing the engine-operated pump, the hand-operated pump supplying liquid pressure to the pressure-operated device during the time when the engine is being started.

9. An exhaust system of the type specified in claim 8 in which a manual stop valve is connected to said liquid line, opening the stop valve serving to relieve pressure in the liquid line thereby stopping the engine.

10. An exhaust system of the type specified in claim 8 which includes means for automatically mainatining a safe level of liquid in the exhaust gas conditioner.

11. In combination with an internal combustion engine, an exhaust system including an exhaust gas conditioner, an exhaust manifold for conducting exhaust gases from the engine to the exhaust gas conditioner, the exhaust gas conditioner having a sump in which a certain safe level of water must be maintained for proper operation of the exhaust gas conditioner, the improvement which comprises: a control-lever which controls supply of an essential fluid to the engine; means constantly biasing the control-lever toward "off" position; pressure-operated means for moving the lever toward "on" position; a liquid line leading from the sump at the safe water level and connected to the pressure-operated means; an engine-operated pump located in said liquid line for supplying liquid pressure to the pressure-operated means during the time when the engine is running; a cooling ring located in the exhaust line for spraying water into the exhaust line; a relief valve located in said liquid line between the engine-operated pump and the pressure-operated means; a liquid line for carrying water from the relief valve to the cooling ring, the relief valve being so set as to permit water to flow to the cooling ring after a proper operating pressure has been built up in the line leading to the pressure-operated means; and a hand-operated pump for supplying liquid pressure to the pressure-operated means during the time when the engine is being started, the hand-operated pump being located in a line which by-passes the engine-operated pump and the relief valve.

12. An exhaust system of the type specified in claim 11 in which a manual stop valve is connected to said liquid line, opening of the stop valve serving to relieve pressure in the fluid line thereby stopping the engine.

References Cited in the file of this patent

UNITED STATES PATENTS

| Number | Name | Date |
| --- | --- | --- |
| 1,847,506 | White | Mar. 1, 1932 |
| 1,920,694 | Hancock | Aug. 1, 1933 |
| 1,932,704 | McQuiston | Oct. 31, 1933 |
| 2,314,900 | Samiran | Mar. 30, 1943 |